J. B. SALMON & E. W. ROY.
MANUFACTURE OF LEATHER COVERS FOR PNEUMATIC TIRES.
APPLICATION FILED APR. 9, 1912.
1,145,616.
Patented July 6, 1915.
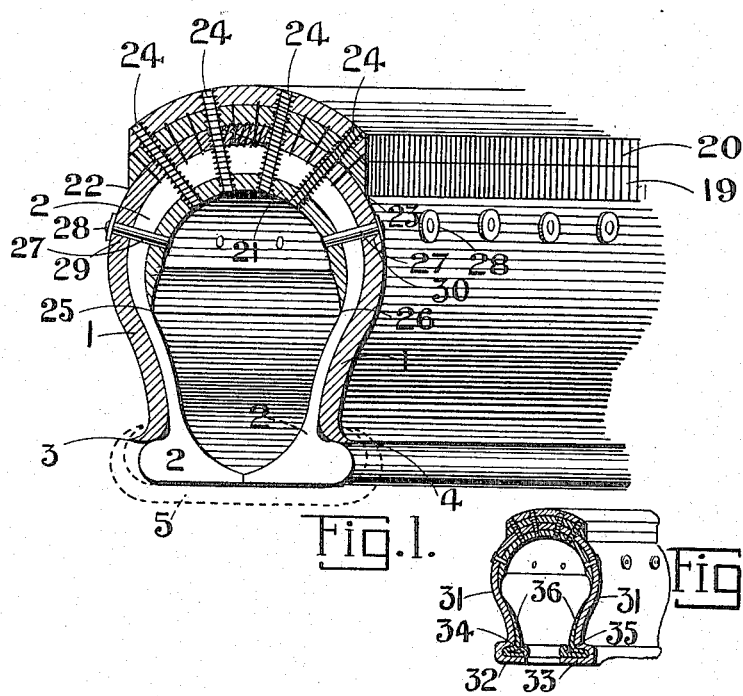
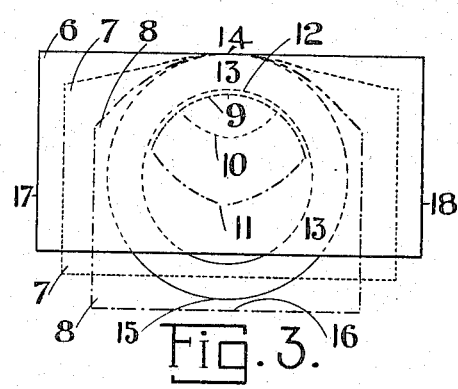

UNITED STATES PATENT OFFICE.

JOHN BOURKE SALMON AND EBENEZER WILLIAM ROY, OF DUNEDIN, NEW ZEALAND.

MANUFACTURE OF LEATHER COVERS FOR PNEUMATIC TIRES.

1,145,616. Specification of Letters Patent. Patented July 6, 1915.

Application filed April 9, 1912. Serial No. 689,680.

*To all whom it may concern:*

Be it known that we, JOHN BOURKE SALMON and EBENEZER WILLIAM ROY, both subjects of the King of Great Britain, residing at Dunedin, New Zealand, have invented new and useful Improvements in the Manufacture of Leather Covers for Pneumatic Tires, of which the following is a specification.

Our invention relates to a method of manufacturing leather tires, and leather covers for rubber tires, from chrome tanned sole leather.

To enable the invention to be clearly understood, the same will be described by the aid of the accompanying drawing, wherein—

Figure 1 is a perspective view of a leather cover and treads, for a rubber tire; Fig. 2 is a similar view of a leather tire and treads thereon; and Fig. 3 is a view illustrative of the manner in which our method is performed.

The material which we employ in the manufacture of the leather articles referred to, is chrome tanned sole leather, before it is dried to form the leather of commerce. In most cases it is advisable to treat the tanned leather with oil and emulsion, or the emulsion alone, but in all cases the leather is prevented from becoming dry until we use the same as hereinafter described.

In carrying our method into practice, we make use of a suitably shaped form, such as an annular wooden block 13, which has a cross sectional outline similar to that of the tire or cover to be produced. To the middle of the tread of the block 13, we tack or otherwise secure about five inches of the central portion of the edge of a long side, 14, of the piece of hide 6 (Fig. 3), the side 14 being preferably skived before being tacked to the block. We then stretch the hide by pulling the latter as much as possible toward the opposite tread 15 of the block 13, until the hide assumes the position 7 indicated in dotted lines in Fig. 3. Then to permit further stretching of the hide, the latter is cut at 9 below the part 14, sufficient hide being left to reach, and be tacked to, a position near the middle of the inner rim 12 of the block 13. The stretching and cutting operations are continued, the hide assuming position 8, and the cut portions successively taking positions 10 and 11. After each stretching and cutting the hide is temporarily tacked to the block 13, until the edge 16, opposite the edge 14, is in a position where it can be tacked to the tread portion 15 of the block, opposite that to which the edge 14 is tacked. By the stretching above described, the short sides 17 and 18 of the hide assume the positions shown in Fig. 3, and are manipulated, stretched and cut, and all the edges are tacked around the middle of the tread portion of the block 13, and around the middle of the inner rim, whereupon the whole of the central portion of the hide is cut out. This completes the formation of one-half of the tire or cover. The other half is formed on the block 13 in the same manner as described in connection with the first half, the edge of a long side of the second piece of hide being tacked to the block, overlapping the skived edge of the first portion, and this overlapping edge is then skived. The second piece of hide is manipulated into the desired form, the article is allowed to dry, and the overlapping edges are then sewn together.

It will be understood that after the piece of hide 6 has been cut and stretched and tacked to the block 13, the edges 14, 16, 17 and 18 are trimmed and skived so as to merge said edges into a single circular strip.

In Fig. 1, the numeral 1 designates the leather cover which is shaped to cover the tire 2, and is also provided with integral portions 3 and 4, which are skived or otherwise treated to take under the wheel rim 5, between the latter and the tire 2. The cover 1 is held in position by the pressure of the pneumatic tire when inflated.

We may also provide one or more treads 19, 20, which are blocked from chrome tanned leather of the character above described. The treads 19 and 20 are placed over the cover 1, and after the treads are taken from the form or block their ends are secured together, and one of these treads, 19 for example, is secured to the leather cover 1 by several rows of stitching. We also prefer to provide an inner strip 21, blocked to the shape of the inside of the rubber tire 2, the inner strip being wider than the treads so as to extend laterally some distance beyond the edges 22, 23 of the tread 19. The second tread 20, manufactured as described in connection with the tire or cover sections, is then superimposed on the tread 19, the strip 21 placed in position within the tire 2, and the whole secured together with screw wire 24 by suitable mechanism. The edges 25, 26 of the inner strip 21 are then secured to the leather cover 1 by suitable means, such as copper rivets 27 and washers 28, preferably about two inches apart extending about the two sides 29 and 30 of the leather tire cover. The cover 1 and treads 19 and 20 are preferably soaked, when dry, in hot paraffin wax to toughen and waterproof them, or any suitable waterproofing preparation may be used for this purpose.

Fig. 2 illustrates a tire, the material of which is prepared in the same manner as above described in connection with the cover 1. The tire 31, which is a substitute for the ordinary rubber tire or tread, is blocked to the shape of the ordinary rubber tire, and is provided with integral triangular portions 32 and 33 which take into the wheel rim. These portions 32 and 33 are made up by securing inserted pieces 34 and 35, of desired material, to the edges of the tire 31 after the latter is blocked.

Repair sections for tires or covers for tires, may be made as hereinabove described in connection with the manufacture of the tire or the leather cover.

What we claim as new and desire to secure by Letters Patent is:—

1. The method of making a leather tire or cover for a rubber tire comprising skiving a long edge of an oblong portion of undried chrome tanned leather, securing the middle of said edge to the middle of the tread of an annular support whose surface is coincident with the inner surface of the cover or tire to be constructed thereover, stretching the leather toward the opposite side of the support, temporarily securing the same to said support, cutting the leather at the inner surface of the support next the original fastening, removing the temporary fastening means, further stretching and cutting the leather until the other long edge reaches the middle of the opposite side of the support, securing the same thereto, stretching and cutting the short sides of the leather until the short side edges reach the middle of the tread of the support, securing the same thereto, completing the cutting out of the central portion of the leather, trimming and skiving said long and short side edges in such manner as to merge said edges into a single circular skived edge, tacking the middle of a long edge of a second similar piece of leather to said support with said edge overlapping the skived edge of said first piece, repeating the steps enumerated in connection with said first piece on the reverse side of the support, stretching and cutting the inner edge portions of the pieces of leather to the required shape to take under a wheel rim, allowing the leather to dry, removing the pieces from the support, and sewing together the overlapping skived edges of said pieces.

2. The method of making a leather tire or cover for a rubber tire comprising skiving a long edge of an oblong portion of undried chrome tanned leather, securing the middle of said edge to the middle of the tread of an annular support whose surface is coincident with the inner surface of the cover or tire to be constructed thereover, stretching the leather toward the opposite side of the support, temporarily securing the same to said support, cutting the leather at the inner surface of the support next the original fastening, removing the temporary fastening means, further stretching and cutting the leather until the other long edge reaches the middle of the opposite side of the support, securing the same thereto, stretching and cutting the short sides of the leather until the short side edges reach the middle of the tread of the support, securing the same thereto, completing the cutting out of the central portion of the leather, trimming and skiving said long and short side edges in such manner as to merge said edges into a single circular skived edge, tacking the middle of a long edge of a second similar piece of leather to said support with said edge overlapping the skived edge of said first piece, repeating the steps enumerated in connection with said first piece on the reverse side of the support, stretching and cutting the inner portions of the pieces of leather to the required shape to take under a wheel rim, allowing the leather to dry, removing the pieces from the support, sewing together the overlapping skived edges of said pieces, and soaking the cover or tire in hot paraffin wax.

In testimony whereof we have signed our names to this specification in the presence of two subscribing witnesses.

JOHN BOURKE SALMON.
EBENEZER WILLIAM ROY.

Witnesses:
　ANDREW JOHN PARK,
　JOHN RUTHERFORD PARK.

Copies of this patent may be obtained for five cents each, by addressing the "Commissioner of Patents, Washington, D. C."